March 21, 1950

O. C. WINZEN ET AL 2,501,559

AERIAL DELIVERY APPARATUS

Filed July 3, 1946

INVENTORS
Otto C. Winzen
Vera H Winzen
By H. J. Woodward
Atty.

March 21, 1950     O. C. WINZEN ET AL     2,501,559
AERIAL DELIVERY APPARATUS Filed July 3, 1946     5 Sheets-Sheet 3

INVENTORS
Otto C. Winzen
Vera H. Winzen
By H F Woodward
 Atty.

March 21, 1950     O. C. WINZEN ET AL     2,501,559
AERIAL DELIVERY APPARATUS
Filed July 3, 1946     5 Sheets-Sheet 4

Inventors
Otto C. Winzen.
Vera H. Winzen.
By H. F. Woodward,
Attorney.

Patented Mar. 21, 1950

2,501,559

UNITED STATES PATENT OFFICE 2,501,559

AERIAL DELIVERY APPARATUS

Otto C. Winzen and Vera H. Winzen,
Minneapolis, Minn.

Application July 3, 1946, Serial No. 681,300

17 Claims. (Cl. 244—138)

This invention relates to improvements in aerial delivery apparatus of the general type disclosed in our co-pending application Ser. No. 620,274, filed October 4, 1945.

The novel apparatus herein disclosed, while not limited to any specific purpose, is particularly well adapted for delivering merchandise, mail, persons, etc. from aerial craft in flight to selected destinations, whereby delays, often incidental to landing aerial craft for making ground deliveries may be avoided. The apparatus will be found particularly useful during periods of war, because by its use aerial cargoes of all kinds may readily be delivered to selected destinations with reasonable assurance, and without endangering the plane to anti-craft fire.

An important object of the invention, therefore, is to provide an improved aerial landing apparatus comprising a suitable container adapted to carry merchandise, and numerous other commodities, as well as persons, and to transport such articles or persons to predetermined destinations with safety, and without subjecting the plane to anti-aircraft fire.

A further object of the invention is to provide such an apparatus comprising a cargo receiving container which is preferably cylindrical in cross-section, and has its end portions streamlined to minimize resistance when in downward flight, and a suitable parachute normally being supported in collapsed condition on the upper end of the container and so arranged that when the container is dropped from an airplane, the parachute is automatically released from the cargo container when the cargo descends to a predetermined altitude, after which the parachute will carry the cargo to earth and safely land it without danger of the cargo container and its load becoming damaged, when brought into contact with the ground.

A further and more specific object is to provide a cargo carrying container having a hollow member secured to its upper end upon which is mounted a main parachute, and a pilot parachute being positioned over the main parachute and having means for normally retaining it in such position, and means being provided for rendering said retaining means ineffective to secure the pilot parachute in folded position, whereby the pilot parachute is automatically released and withdraws the main parachute from its position upon the upper end of the cargo container, whereby the main parachute or canopy is exposed to the air currents and is opened and thereby retards the downward descent of the container and its cargo whereby it may be landed without danger of the container or its cargo becoming damaged when the container contacts the ground.

A further and more specific object is to provide an apparatus of the character disclosed comprising a container provided at its upper end with a hollow member adapted to contain a control mechanism for the cargo container, which mechanism controls the automatic release of the parachute from the cargo container, after the latter has been dropped from a plane and descends to a predetermined altitude, whereby the parachute opens and safely carries the container and its load to a safe landing.

A further and more specific object is to provide a novel control mechanism for effecting the release of a parachute from a cargo carrying container, after the latter has been dropped from a plane and descends to a predetermined altitude, said control mechanism including a pressure sensitive device having an electric circuit comprising a pair of normally open contacts, which contacts are adapted to be closed when the cargo container reaches a predetermined altitude, thereby presenting a circuit to the control mechanism, whereby said mechanism may operate and automatically effect the release of the main parachute from its collapsed position on the container, whereby the parachute will control the downward or falling movement of the cargo container after the latter has passed below the altitude at which pressure sensitive control element was set before the take-off.

Other objects of the invention reside in the specific construction of the means for controlling the automatic release of the parachute from its packed position upon the cargo container; in the means provided for instantly releasing the parachute from the cargo container, the moment the container strikes the ground upon landing; in the provision of means for enclosing the aneroid and in the static tube connected thereto for maintaining an air pressure in the enclosing means for the aneroid which is equal to the ambient pressure about the cargo container at all elevations; and in the unique and simplified construction of the cargo container, and parachute mounting means, and in the means for automatically controlling the release of the parachute from the cargo container at a predetermined elevation, and also in the simplified construction of the means for automatically releasing the parachute from the load upon landing of the load and whereby danger of the parachute becoming damaged is greatly minimized.

These and other objects of the invention and the means for their attainment will be more apparent from the following description, taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

It is well known to those skilled in the art that there are many occasions when it is desirable that some means be provided for automatically opening a parachute at a predetermined altitude above the ground. The novel apparatus herein disclosed fully meets all of the requirements of such an apparatus, and comprises means for packing a main parachute in a pilot parachute; means for automatically effecting the opening of the main parachute at a predetermined distance above the ground so that the parachute may retard the falling speed of the cargo to a safe landing; and means for automatically releasing the parachute from the cargo, the moment the cargo contacts the ground.

Figure 11:
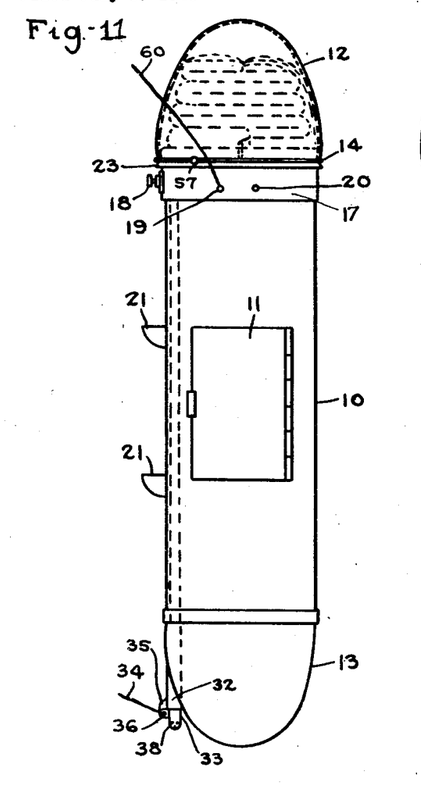
Figure 11 is an elevational view of an aerial container having a static tube mounted for vertical sliding movement therein, the static tube being shown in its normal retracted position.

The novel apparatus herein disclosed is shown comprising a cargo receiving container, generally designated by the numeral 10. The body of the container is preferably cylindrical in cross-section, but it is to be understood that it may be otherwise shaped, if desired. It is shown having a side door 11, as shown in Figures 1 and 11, to facilitate loading and unloading, but in some instances it may be found more feasible to load it from the top, and the container 10 is therefore so constructed that it may also be loaded from the top, when desired.

Figure 9:
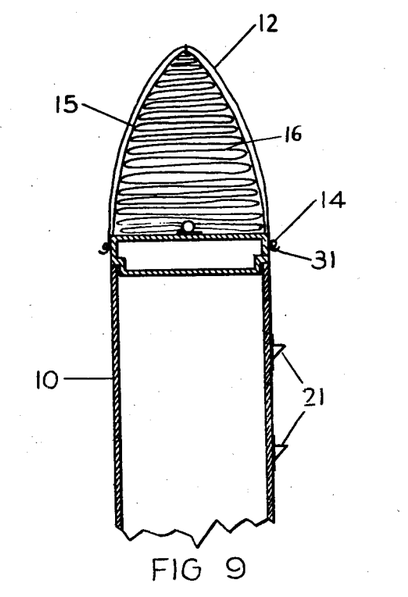
Figure 9 is a vertical sectional view of the container shown in Figure 8.

The bottom end of the container is shown closed by a shock absorbing member 13 secured to the walls of the container by suitable means, not shown. A hollow member 17 provides a closure for the open top of the container, and preferably has a portion 17' fitting into the top end of the container, as best shown in Figures 2, 3 and 9.

Figures 1, 2:
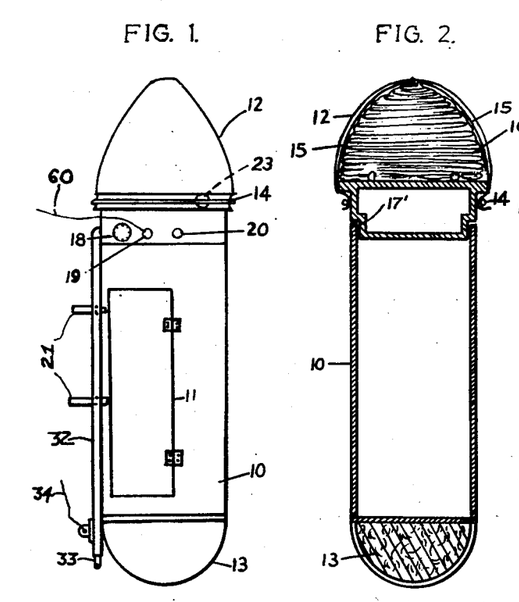
Figure 1 is a view showing our improved aerial delivery container with the parachutes attached thereto and the main conveyor being completely concealed.
Figure 2 is a vertical sectional view of the container shown in Figure 1, with some of the parts omitted, and showing the pilot parachute enclosing the main parachute.
Figure 3:
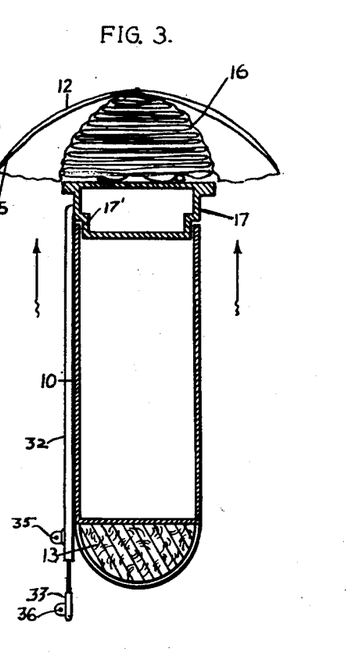
Figure 3 is a view similar to Figure 2, but showing the pilot parachute partially open.

A main parachute 16, folded into a compact pack, is normally supported upon the top wall of the hollow member 17, as shown in Figures 2 and 3, and is retained in position thereon by a pilot parachute 12 comprising a plurality of spring-like elements 15 for quickly opening the pilot parachute, when it is released, as will subsequently be described. The pilot parachute 12 is normally retained in closed position over the main parachute 16 by a cord 14, coiled about the lower marginal edge of the pilot parachute and the hollow member 17. The member 17 preferably has an annular flange at its uppermost end beneath which the cord 14 is wound, and whereby the cord cannot accidentally become disengaged from the member 17, as will be understood by reference to Figure 2.

Figure 4:
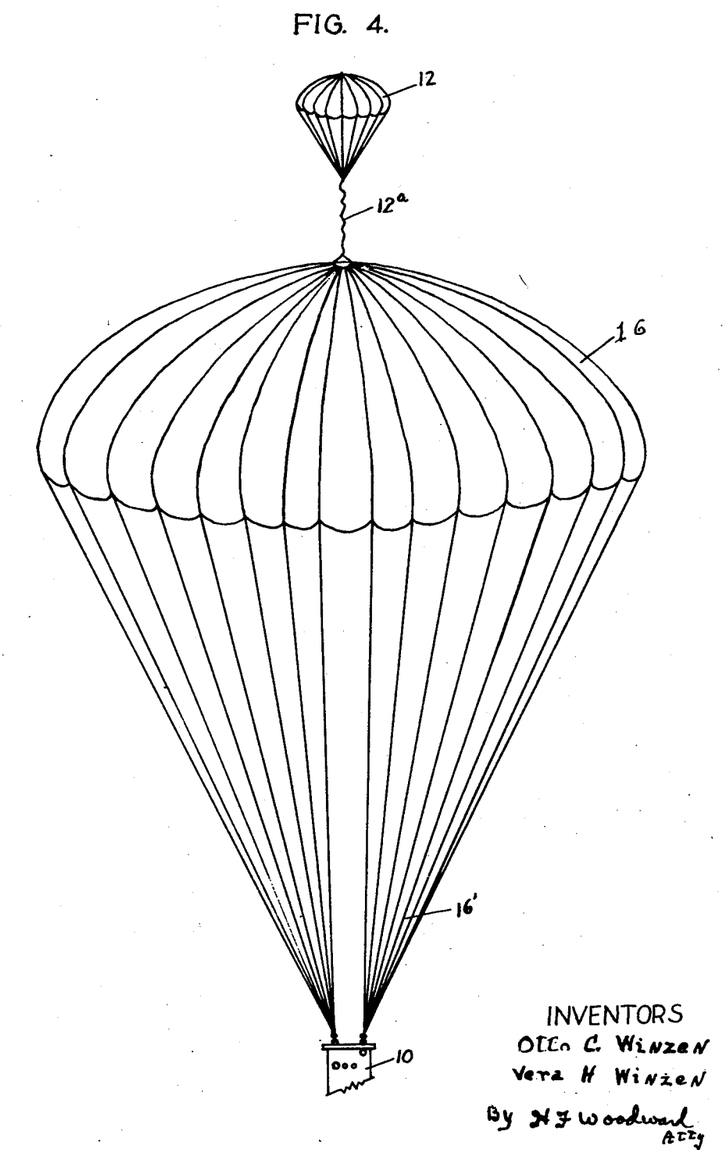
Figure 4 is a view showing the pilot and main parachutes in open positions to retard the falling speed of the loaded container and to assure a safe landing for the cargo.

It will thus be noted that the pilot parachute 12 normally provides a complete closure for the main parachute 16, and also retains it in its closed inoperative position when the cargo container 10 is in transit within the plane, or during the time in which the control circuit, later to be described, is in open, non-energized condition. The pilot parachute also serves to initially withdraw the closed main parachute from its inoperative position on top of the hollow member 17, whereby air enters the main parachute and quickly inflates or expands it to load-carrying condition, as shown in Figure 4.

Figure 5:
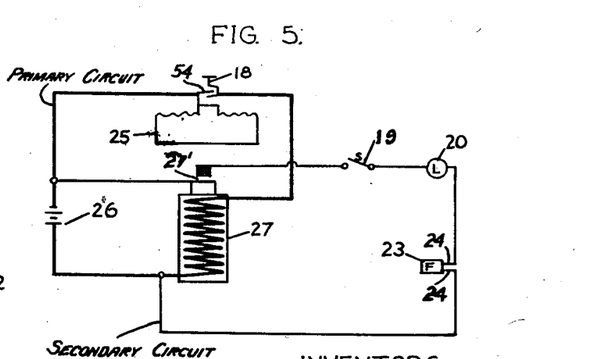
Figure 5 is a wiring diagram showing the electrical connections between the various control elements of the control circuit.

The parachute release mechanism includes a pressure sensitive device such as an aneroid, generally designated by the numeral 25, which may be of any well known design. In the present instance, the aneroid is shown having two bellows but obviously the number of bellows may be varied as desired. The aneroid has a knob 18 and the dial 18a for indicating the altitude at which the aneroid may be set to close its contacts 54 and effect the release of the parachutes 12 and 16 at a selected altitude, as, for example, two thousand feet above sea level. The aneroid is interposed in an electric circuit, indicated in heavy lines in Figure 5, and which will hereinafter be referred to as the primary circuit. The primary circuit is connected to a source of electric energy, such as a battery 26. A relay 27 is connected in series with the primary circuit, as shown in Figure 5, and has a pair of contacts 27' interposed in a secondary circuit, indicated in light lines in Figure 5. The secondary circuit has a manually operable control switch 19 and a warning light 20 connected therein, and it will also be noted that the explosive element 23 is connected in series therewith.

Figure 6:
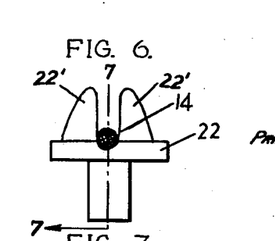
Figure 6 is an exterior view of an explosive device for releasing the parachute securing cord.
Figure 7:
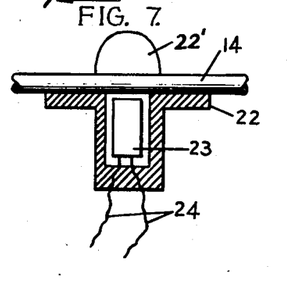
Figure 7 is an enlarged detail sectional view on the line 7—7 of Figure 6.

The explosive element 23 is contained within a small flanged housing 22 suitably supported on the cylindrical wall of the hollow member 17, in alignment with the cord 14, whereby the cord may be supported between a pair of spaced ears 22' provided on the housing 22, as best illustrated in Figures 6 and 7. It will also be noted by reference to Figures 1 and 11, that the housing 22 is disposed in alignment with the cord 14, whereby when the cord is wound about the member 17 to secure the pilot parachute in closed position over the main parachute, the cord will readily drop into the space or gap between the ears 22'. When thus positioned, the explosive element 23 is aligned with the cord 14 whereby when the secondary circuit is energized and the explosive element 23 is fired, the cord 14 is severed and thus releases the pilot parachute and permits it to open, as indicated in Figure 3. Wires 24 electrically connect the explosive element 23 in the secondary circuit, as will be understood.

The warning light 20 may be mounted in the wall of the hollow member 17 and serves to indicate to the pilot the condition of the control circuits.

When utilizing the aerial cargo landing mechanism herein disclosed, the aneroid 25 is preferably pre-set before the takeoff to cause the primary circuit to become de-energized when the plane reaches the selected altitude of two thousand feet, the altitude at which the main parachute is subsequently to be released during the falling period of the cargo container 10. The contacts 54 of the aneroid 25 are closed when the plane is grounded, because of the relatively higher atmospheric pressure, and remain so until the plane reaches the altitude at which the aneroid is set, in the present instance two thousand feet. Above the two thousand foot altitude, the bellows of the aneroid expand and automatically open the aneroid contacts whereby the primary circuit is de-energized. Thus the primary circuit is always open when the plane ascends to an elevation of two thousand feet or higher. The aneroid may, if desired, be pre-set at any time during flight.

Figure 15:
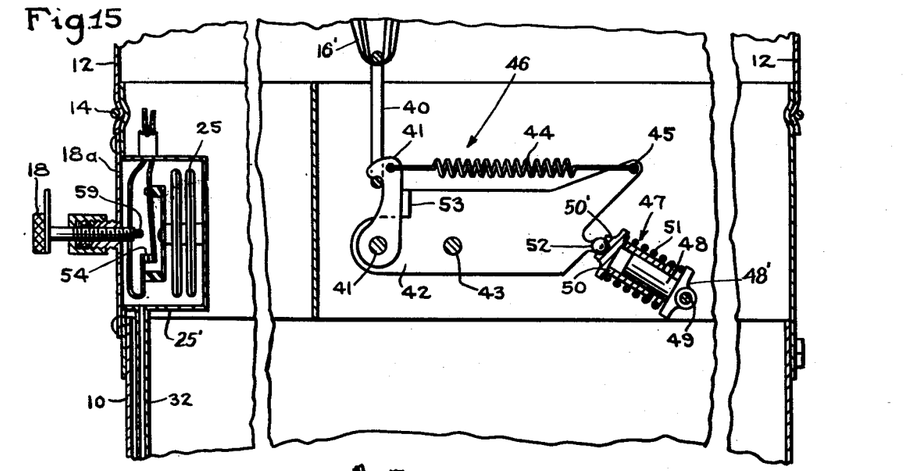
Figure 15 is an enlarged detail sectional view of a portion of the cargo container, showing the means for detachably securing the parachute thereto, and also showing the contacts of the aneroid in closed position, and the housing for the aneroid.

Before dropping the cargo container 10 from the plane, the pilot manually closes the switch 19 to condition the secondary circuit for operation. The secondary circuit, however, cannot be completed to the explosive element 23 until the container 10, in its falling movement, drops to the two thousand foot altitude, whereupon the bellows of the aneroid 25 collapse sufficiently to close the aneroid contacts 54, as shown in Figure 15, and thus cause energization of the primary circuit. The moment the primary circuit is energized, the relay 27 is energized and closes the contacts 27' of the secondary circuit, whereby said circuit is completed to the explosive element 23 and causes said element to fire and sever the cord 14. Such severance of the cord 14 effects the release of the pilot parachute 12 and permits it to open and withdraw the main parachute 16 from the hollow member 17, whereby the main parachute immediately spreads its folds, as shown in Figure 4, and safely conveys the load or cargo to its destination.

Figure 8:
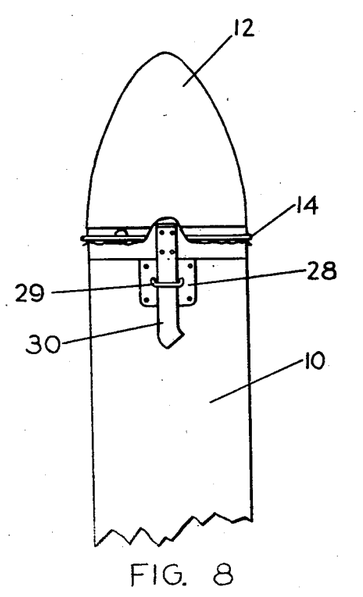
Figure 8 is a view showing an aerial container of slightly modified construction with its lower portion broken away.

It is to be understood that the apparatus may be used for landing persons from a plane in flight as well as cargo. The cargo container 10 is preferably shaped more or less like a streamlined projectile to minimize air resistance during its downward flight. In Figures 8 and 9, there is shown a cargo container 10 comprising a control mechanism container 31 which is somewhat similar to the corresponding member 17 shown in the previous figures. In the form shown in Figures 8 and 9, the main parachute 16 is secured in position on the hollow member 31 by the pilot parachute 12, which in turn is secured to the hollow member 31 by the cord 14. Straps 30 are shown having their upper ends fastened to the cylindrical wall of the hollow member 31 and are adapted to be received in suitable buckles 29 having plates 28, whereby they may be fixedly secured to the wall of the container 10, as shown in Figure 8. The straps 30 facilitate the operation of securing the member 31 to the container 10 or detaching it therefrom.

Figure 10:
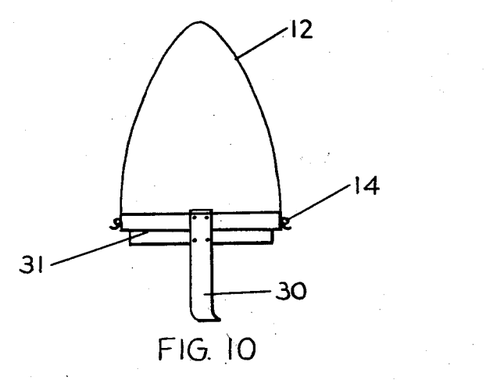
Figure 10 is an external view of the upper end of the container shown in Figure 9.

The construction and operation of the apparatus shown and described with reference to Figures 8, 9 and 10, is very similar to the construction and operation of the apparatus shown in Figure 7, in that its aneroid may be previously prepared and made ready to be attached to a cargo container before a takeoff. The hollow member 31 for housing the control mechanism may, as in the previous figures, be considered a cover or lid for the cargo container 10. In some instances it may be deemed advisable to provide a projectile or bomb-shaped cargo container 10 with means such as a drag parachute or fins for stabilizing the container in its downward flight or free fall.

Figure 16:
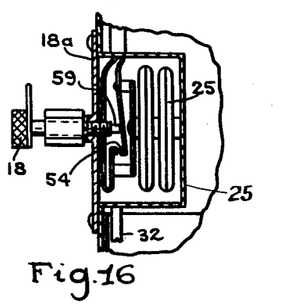
Figure 16 is a fragmentary detail sectional view showing the bellows of the aneroid expanded to open the aneroid contacts.

Means is provided for stabilizing the operation of the aneroid 25, and is shown comprising a housing 25' for enclosing at least the bellows of the aneroid, as shown in Figures 15 and 16. A static tube 16 is shown mounted on the wall of the cargo container 10, and has its upper end in communication with the interior of the housing 25'. A tube section 33 is telescopically supported in the lower end of the tube 32, and is adapted to have its lower end portion projected from the tube 32 against the tension of a suitable spring 37, shown in Figure 17. When thus projected from the static tube 32, the air intake holes 38 provided in the lowermost end of the tube section 33 will be disposed well ahead of the shock wave or aerodynamic disturbances created around the body of the container 10 during the falling of the container prior to its reaching the two thousand foot elevation at which the aneroid is set. The static tube 32 serves to maintain an air pressure in the bellows housing 25' which will be substantially equal to the ambient pressure of the air around the falling container 10.

Figure 12:
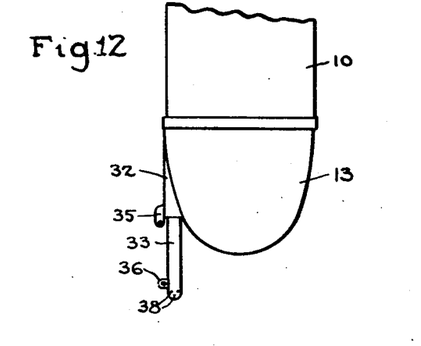
Figure 12 is a view showing only the lower end of the container with the static tube extended.
Figure 17:
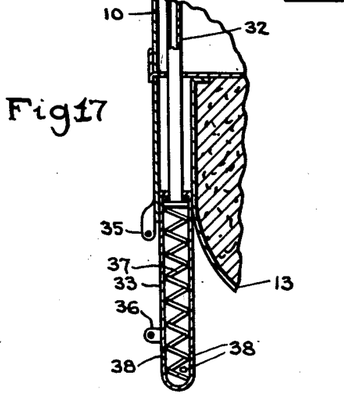
Figure 17 is an enlarged fragmentary detail sectional view of a lower portion of the container showing the static tube in extended position.

When the cargo container is supported in the bomb rack or bomb bay, prior to being released from the plane, the telescopic tube section 33 is retained in its retracted position by a pin 33', received in aligned apertures provided in interfitting ears or lugs 35 and 36 provided, respectively, on the static tube 32 and on the lower end of the telescopic tube section 33, as will be understood by reference to Figures 1, 11, 12 and 17. A cord 34 has one end secured to the pin 33' and its opposite end to a structural part of the plane or bomb rack, whereby when the cargo container 10 is released from the plane, the cord 34 will withdraw the pin 33' from the ears 35 and 36 and automatically release the tube section 33. When thus released, the telescopic tube 33 is instantly moved to its extended position by the spring 37, as shown in Figures 12 and 17.

In some instances it may be found desirable to so design the static tube and its mountings that the moment the parachute opens, the telescopic tube section 33 is retracted. The deceleration force acting against the lower end of the tube section 33 may be sufficient to force the telescopic tube section back into its normal retracted position in the tube 32, as it has then served its purpose. However, in war time, when this equipment is classified as expendable, such precautions are unnecessary.

Figure 13:
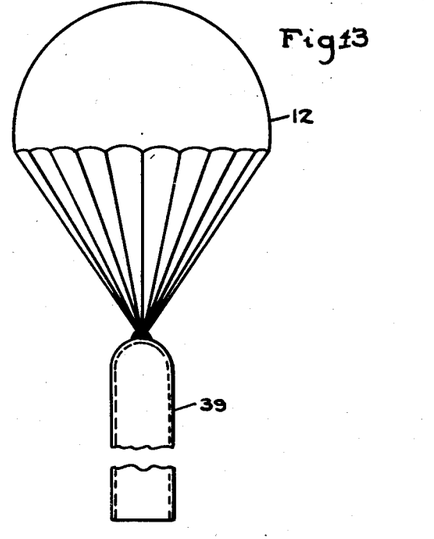
Figure 13 is a view showing a form wherein the pilot parachute is attached to a sleeve adapted to normally support and conceal the main parachute before opening.
Figure 14:
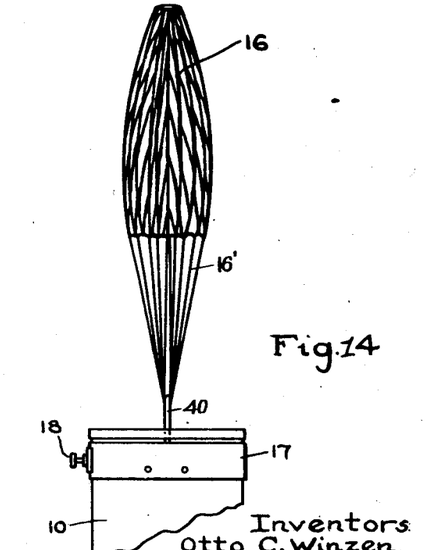
Figure 14 is a view showing a quick opening parachute attached to a high speed container.

In Figures 13 and 14 there is shown a structure wherein the main parachute 16 is normally contained within a tubular member or sleeve 39, to the upper end of which the pilot parachute 12 is attached, as shown in Figure 13. When the pilot parachute 12 is released during descent of the cargo container 10, the pilot parachute 12 withdraws the member 39 from the main parachute or canopy 16, whereupon the latter opens and decreases the falling speed of the container 10 so that the cargo may be safely landed at its selected destination.

The parachute arrangement above described and shown in Figures 13 and 14, is particularly useful when utilizing ribbon type parachutes. It is well known that ribbon type parachutes are designed to open at speeds far in excess of the opening speeds of standard parachutes. Inasmuch as the downward velocity of a falling streamlined aerial delivery container may approach the speed of sound (depending on load), ribbon type or other high speed parachutes are often employed in connection with such cargo containers. The sleeve 39, shown in Figure 13, facilitates the operation of packing the main ribbon canopy or parachute 16, and also permits said canopy to quickly open without danger of damage to its ribbon lattice construction, when the main parachute is released to open. Ribbon type parachutes may be highly desirable, when handling fragile cargoes, because they materially reduce the shock to which the cargo is subjected, when the parachute suddenly opens.

In Figures 1 and 3 the static tube 32 is shown mounted on the wall of the cargo container 10, exteriorly thereof, while in Figure 11 it is shown mounted within the container with its lower end projecting through an opening in the bottom member 13 of the container, as best shown in Figure 17.

Figure 18:
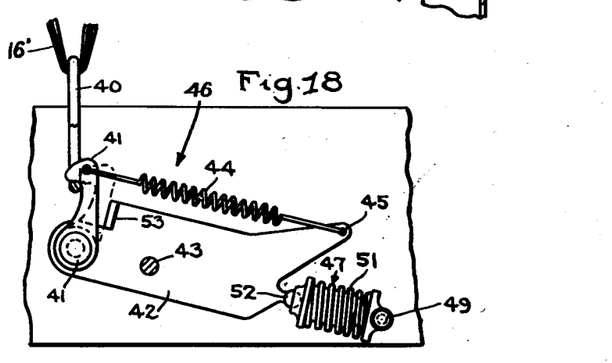
Figure 18 is a fragmentary view showing the parachute release mechanism conditioned to release the parachute upon contact of the container with the ground.
Figure 19:
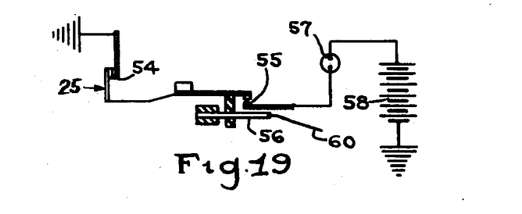
Figure 19 is a wiring diagram of a modified structure for releasing the pilot parachute.

To minimize the danger of damaging the parachute, upon landing of the cargo, means is provided for automatically releasing the parachute from the container 10, the instant the container strikes the ground or some fixed object upon completion of its descent. To thus release the parachute from the cargo container 10, there is illustrated in Figures 18 and 19, a parachute release mechanism, generally designated by the numeral 46, comprising a plate 42 having its intermediate portion pivotally mounted upon a fixed pivot or pin 43. A suitable hook 41 is mounted for limited pivotal movement upon a pivot pin 41' secured in one end of the plate 42 and normally retained in engagement with a fixed lug 53 by a spring 44. One end of the spring 44 is shown attached to the hook 41 and its opposite end to the plate 42, as indicated at 45 in Figure 18.

Means is provided for yieldably retaining the plate 42 in its normal hook-locking position, shown in Figure 15, whereby the parachute cannot become disengaged from the cargo container 10, during the descent of the container, said means being so constructed, however, that when the container initially strikes the ground upon landing, the slight jar imparted to the container will actuate said means and cause it to momentarily move the hook out of engagement with the parachute 16, and thus automatically release the parachute from the load.

The means provided for thus effecting the release of the parachute upon landing of the cargo, is shown including a device, generally designated by the numeral 47. This device comprises an inner cylindrical member 48 having a head 48' pivotally mounted on a fixed pivot pin 49. An outer sleeve 50 is slidably fitted over the cylindrical member 48 and has a head 50' having a centrally disposed recess therein adapted to receive a spherical element or ball 52, secured to the adjacent end of the plate 42. A spring 51 is interposed between the heads of the member 48 and sleeve 50 and constantly tends to elongate the device 47, thereby to retain the plate 42 in the position shown in Figure 15, with its lug 53 engaged with the hook 41. When the plate 42 is thus positioned, the hook cannot release the parachute.

When the main parachute 16 opens at the selected two thousand foot altitude, after the cargo container has been released from the plane flying at a relatively higher elevation, the container 10 is suspended from the hook 41, and during the descent of the container, the plate 42 remains in the position shown in Figure 15, with its lug 53 engaging the hook 41. When the cargo or container subsequently contacts the ground, as in landing, the plate 42 is momentarily shifted to the position shown in Figure 18, whereby the lug 53 is moved out of engagement with the hook 41 and thus permits the spring 44 to move the hook out of engagement with the ring 40 secured to the shroud lines 16' of the parachute. When the hook 41 thus becomes disengaged from the ring 40, the parachute 16 is completely released from the cargo and usually quickly collapses adjacent thereto.

In Figure 19 there is illustrated a wiring diagram of a control circuit of slightly modified construction. It includes the aneroid 25, having contacts 54 as in the previous figures; a pair of contacts 55 which are normally retained in open or spaced relation by a pull-out pin 56, an explosive element 57, similar to the element 23 of Figure 5, and a source of electric current such as a battery 58. The contacts of the aneroid 25 are normally closed, as shown in Figure 19, when the plane is grounded, and remain so until the plane ascends to the altitude at which the aneroid may be set as, for example, two thousand feet.

After the takeoff, and the plane ascends to an altitude of two thousand feet, the contacts of the aneroid are automatically opened by the action of the aneroid and remain open so long as the plane remains above the two thousand foot altitude. When the plane reaches a position over the destination at which the cargo is to be delivered, the cargo is dropped from the plane whereupon the pull-out pin 56 is withdrawn by a cord 60 having one end attached to the pin and its opposite end to a fixed part of the plane. Such withdrawal of the pin 56 permits the contacts 55 to close, whereby the control circuit contained within the hollow member 17 of the cargo container 10 is conditioned for operation, when the cargo reaches the two thousand foot elevation in its falling movement.

The moment the cargo container passes below the two thousand foot altitude at which the aneroid is set, the aneroid automatically completes the circuit to the explosive element 57, whereby it is fired and severs the cord 14, thereby releasing the parachutes from the cargo container so that the main parachute 16 may unfold and retard the descent of the cargo and assure its safe landing.

When the cargo container 10 contacts the ground, the parachute 16 is automatically released from the container by the mechanism shown in Figures 15 and 18. It will also be noted that the modified control circuit disclosed in Figure 19 operates in a manner very similar to the control circuit shown in Figure 5, in that when the plane is transporting the cargo container 10 at an elevation above the setting of the aneroid, or two thousand feet, the circuit to the explosive element 57 cannot be completed because of the aneroid contacts being in circuit opening position. The moment the cargo container descends to an elevation of two thousand feet, after having been dropped from the plane, the contacts of the aneroid close and thus complete the circuit to the explosive element 57, whereby it is fired and severs the cord 14 and thus effects the automatic release of the parachute.

It will be apparent to those skilled in the art that we have accomplished at least the principal objects of our invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that our invention is not limited thereto.

What is claimed:

1. An aerial delivery apparatus comprising a bomb shaped cargo supporting means having a series of compartments therein, means for stabilizing the cargo supporting means during its free falling movement, a pilot parachute attached to the supporting means, a main parachute packed in the pilot parachute and attached to the supporting means, a release cord for attaching the pilot parachute to the supporting means, means for severing the release cord and permitting the parachutes to open when the cargo supporting means reaches a predetermined elevation during its free falling movement, and a spring-operated latch for releasing the parachute from the supporting means when said supporting means contacts the ground upon landing.

2. An aerial cargo delivery apparatus comprising a cargo container having a top wall, a main parachute folded into a compact bundle and supported on said wall, a pilot parachute attached to the main parachute and overlying the main parachute to provide a closure therefor, means for securing the pilot parachute in position over the main parachute, means in the upper portion of the container for automatically releasing the parachutes from the container, said means including a pressure responsive element adapted to be actuated by variations in atmospheric pressure to cause said parachute release means to operate and release the parachutes at a predetermined elevation during the free falling movement of the parachute, and a mechanism for automatically effecting the release of the parachute from the cargo container upon landing.

3. An aerial cargo delivery apparatus comprising a cargo container having a shock absorbing means at its lower end for minimizing shock upon landing, means for providing a compartment at the upper end of the container, means for releasably securing a parachute to the upper wall of said compartment, a main parachute packed within the pilot parachute, and a control mechanism within said compartment having an operative connection with the pilot parachute and adapted upon reaching a predetermined elevation during the free falling movement of the cargo container, to first effect the release of the pilot parachute from its securing means, whereby the main parachute may unfurl its canopy and thereby retard the falling movement of the container, and means for automatically releasing the parachutes from the container when the container contacts the ground upon landing.

4. An aerial cargo delivery device comprising a cargo container having a compartment at one end, an electric control circuit in said compartment having a connection with a source of electric power and including a pair of contacts, a pressure responsive device for normally retaining said contacts in circuit closing position, means providing a closed chamber for the pressure responsive device, and means for maintaining the air pressure within said chamber substantially equal to the ambient air pressure around the cargo container during the free falling period of the container.

5. An aerial cargo delivery device comprising a cargo container having a hollow member at its upper end forming a compartment provided with a top wall, a main parachute supported on said wall, a pilot parachute attached to the main parachute and supported thereon and having its canopy overhanging the marginal edge of said top wall, a cord securing the pilot parachute to said wall whereby the pilot parachute conceals the main parachute, a control means within said compartment including a pressure responsive device for automatically releasing the pilot parachute from said cord, when the cargo container reaches a predetermined altitude during its free falling movement, and whereby the main parachute will open to support the load, and means also in said compartment made operable to automatically release the parachute from the cargo container when the container contacts the ground upon landing.

6. An aerial delivery apparatus comprising a cargo container having means for releasably securing a parachute thereto in folded condition and adapted to automatically release the parachute from its securing means to permit it to open and retard the falling velocity of the container at a predetermined altitude during the free-falling period of the container, and a mechanism for automatically releasing the parachute from the container when the container contacts the ground upon landing, said means including a spring biased hook having an operative connection with the shroud lines of the parachute during descent, and made operative by the impact of the container with the ground, thereby to move said hook out of operative engagement with the shroud lines and effect the complete release of the parachute from the container.

7. An aerial delivery apparatus comprising a cargo container having means for supporting a main parachute on the upper portion thereof and having a pilot parachute overlying and concealing the main parachute and provided with means for securing it in such position, said securing means being operable to release the parachute when the container reaches a predetermined elevation during its free falling movement, and a mechanism for completely releasing the parachute from the container when the container contacts the ground upon landing, said mechanism comprising a plate mounted for pivotal movement within the container and having a hook pivoted to one end thereof adapted to be operatively connected to the parachute, and a spring-actuated device engaged with said plate and adapted normally to retain the hook in engagement with the parachute and being made operable by a slight shock imparted to the container, upon landing, to effect the complete release of the parachute from the hook within the container.

8. An aerial delivery apparatus comprising a pilot parachute, a main parachute normally contained in the pilot parachute, a pressure responsive device for releasing the pilot parachute at a predetermined distance above ground, a housing for enclosing the pressure responsive device, a static tube communicating at one end with said housing, and the other end of said tube having a section slidably secured thereto.

9. An aerial delivery apparatus comprising a cargo container, means for securing a pilot parachute to the cargo container, said pilot parachute normally being retained in closed position, a main parachute normally concealed by the pilot parachute and operatively connected to the cargo, a pressure responsive aneroid for closing an electric circuit, and an explodable element in said circuit for effecting the automatic release of the pilot parachute at a predetermined elevation, whereby the main parachute is rendered effective to retard the descent of the cargo, a housing for the aneroid, and a static tube having one end in communication with the interior of the housing, and its other end in communication with the atmosphere.

10. An aerial delivery apparatus comprising a cargo container, a parachute secured to the cargo container, a pressure responsive means for causing the parachute to open at a predetermined elevation, and a static tube connected to the pressure responsive means and extending at least the length of the container.

11. An aerial delivery apparatus, including a pilot parachute, a sleeve member secured to the pilot parachute, a main parachute normally packed in said sleeve member, but being free of any connection to the sleeve, a pressure responsive device for releasing the pilot parachute at a predetermined elevation above the ground, and a static tube having one end connected to said pressure responsive device and having its opposite end partially closed.

12. An aerial apparatus comprising a cargo container having a compartment therein, a parachute attached to the container, a pressure responsive device in said compartment for causing the parachute to open at a predetermined elevation, a static tube having a section carried by said container and communicating with the interior of said compartment, and said static tube having a section telescopically connected thereto.

13. An aerial delivery apparatus, including a container, a parachute secured to the container, a pressure responsive device associated with the container for releasing the parachute at a predetermined distance above the ground, and a static tube associated with the pressure responsive means and extending along the side of the container substantially the full length thereof.

14. An aerial delivery apparatus comprising an elongated container having separate compartments in its upper and lower portions, a parachute attached to a wall of the upper compartment, a pressure sensitive release device in the upper compartment, and a tube communicating with the interior of the upper compartment and extending substantially the length of the container.

15. An aerial cargo delivery apparatus comprising a cargo container having a compartment therein, a parachute attached to said container, a parachute release mechanism in said compartment for automatically releasing the parachute from the container, when the parachute contacts the ground, a pressure sensitive device also contained in said compartment and including an evacuated bellows, a pair of electric contacts associated with said bellows, an electric circuit connected to said contacts, and a dial control rod for opening the electric circuit upon expansion of said bellows.

16. An aerial delivery apparatus comprising a bomb-shaped container, a parachute releasably attached to said container, a pressure sensitive device for effecting the release of the parachute at a predetermined distance above ground, an electric control circuit for said device, including an explosive element adapted upon energization of the circuit to sever the connection between the parachute and the container, and a static tube having one end in communication with the pressure sensitive device and its opposite end open to the atmosphere to permit free passage of air therethrough at all times.

17. An aerial delivery apparatus comprising a container, a pilot parachute, a main parachute operatively associated with the pilot parachute and releasably attached to the container, a pressure responsive device in the container for effecting the release of the pilot parachute at a predetermined distance above ground, and a tube extending along the side of the container and having one end in communication with the pressure responsive device, and its opposite end open to the atmosphere to permit free passage of air therethrough.

OTTO C. WINZEN.
VERA H. WINZEN.

REFERENCES CITED

The following references are of record in the file of this patent:

UNITED STATES PATENTS

| Number | Name | Date |
|---|---|---|
| 1,709,264 | Holt | Apr. 16, 1929 |
| 1,755,414 | Smith | Apr. 22, 1930 |
| 1,793,729 | Askam | Feb. 24, 1931 |
| 2,118,603 | Hailey | May 24, 1938 |
| 2,365,445 | Badowski | Dec. 19, 1944 |
| 2,382,442 | Rich | Aug. 14, 1945 |
| 2,400,165 | Porter | May 14, 1946 |

FOREIGN PATENTS

| Number | Country | Date |
|---|---|---|
| 129,017 | Great Britain | July 10, 1919 |
| 278,695 | Great Britain | Apr. 5, 1928 |
| 585,265 | Great Britain | Feb. 3, 1947 |
| 726,543 | France | Mar. 7, 1932 |